United States Patent [19]
Bielinski et al.

[11] Patent Number: 5,543,965
[45] Date of Patent: Aug. 6, 1996

[54] METHOD AND APPARATUS FOR AUTOSTEREOSCOPIC LENTICULAR DISPLAYS UTILIZING RANDOM DOT PATTERNS

[75] Inventors: Michael S. Bielinski; Paul G. Herber, both of Arlington, Tex.

[73] Assignee: NVision Grafix, Inc., Irving, Tex.

[21] Appl. No.: 240,616

[22] Filed: May 11, 1994

[51] Int. Cl.$^6$ ................................................ G02B 27/22
[52] U.S. Cl. .......................... 359/463; 359/462; 359/466; 359/478
[58] Field of Search ..................................... 359/462, 463, 359/466, 454, 455, 458, 478; 352/57, 60, 87, 239

[56] References Cited

U.S. PATENT DOCUMENTS

| | | |
|---|---|---|
| 759,229 | 5/1904 | Bechtold et al. . |
| 1,545,590 | 7/1925 | Macy . |
| 1,955,275 | 4/1934 | Draper . |
| 2,035,511 | 3/1936 | Silverstein . |
| 2,114,060 | 4/1938 | Oakley . |
| 2,151,301 | 3/1939 | Percy et al. . |
| 2,210,806 | 8/1940 | Etbauer . |
| 2,218,875 | 10/1940 | Parsell . |
| 2,263,351 | 12/1941 | Tanaka . |

(List continued on next page.)

FOREIGN PATENT DOCUMENTS 17229 of 1899 United Kingdom .

OTHER PUBLICATIONS

Making Computer–Combined Phscolograms, Creating the Stealth Negative, Quad/Graphics, by William T. Cunnally, Feb. 1989.
New Advances in Computer–Generated Barrier–Strip Autostereography, SPIE, Vo. 1256, Stereoscopic Displays & Applications, 1990.
Seeing The Light: Optics In Nature, Photography, Color, Vision & Holography, 1986.
The Autostereogram, by C. W. Tyler & M. B. Clark, Smith–Kettlewell Eye Research Institute, 1990.
Chaper 13–Cyclopean Vision, by C. W. Tyler, vol. 11, Binocular Visition, pp. 38–74, 1991.
Cooperative Phenomena In Binocular Depth Perception, by B. Julesz, vol. 62, Jan./Feb. 1974 Issue.
The Texton Theory of Vision Sheds Light On How We See, by B. Julesz & G. T. Moffatt, AT&T Bell Laboratories Record, May 1984.
Brochure of N.E. Thing Enterprises–Advertisement for 1992 Calendar.
Mental Holography: Stereograms Portraying Ambiguously Perceivable Surfaces, by B. Julesz & S. C. Johnson, Bell System Tech. Journal, vol. 47, No. 10, Dec. 1968.
Brochure–Pentica Loves Puzzles, inc: Single Image Random Dot Stereograms from May/Jun. 1990 Stereo World & Mar./Apr. 1990 Stereo World article Random Dot Stereograms.
Stare–Eo, Toy or More? Computers and Mining, vol. 7, No. 4, Dec. 1991.
Stereo World Triggers Dot Avalanche, Stereo World, Jul./Aug. 1991.
Vivid 3D Technique for Newspapers, East Side Monthly, Sep. 1991.

*Primary Examiner*—Paul M. Dzierzynski
*Assistant Examiner*—Darren E. Schuberg
*Attorney, Agent, or Firm*—Harold E. Meier

[57] ABSTRACT

A lenticular autostereoscopic display includes a first layer, containing a composite image frame. The composite image frame is generated by creating a plurality of random dot image frames. Closely related pairs of image frames form a stereoscopic image when viewed stereoscopically. The plurality of random dot image frames are interlaced into a plurality of alternating vertical strips, and a lenticular material is placed over the composite image frame, allowing a viewer to perceive the stereoscopic image or images created by the interlaced random dot image frames.

19 Claims, 7 Drawing Sheets

U.S. PATENT DOCUMENTS

| | | |
|---|---|---|
| 2,391,248 | 12/1945 | Koch . |
| 2,472,259 | 6/1949 | McPherson . |
| 2,603,124 | 7/1952 | Richards . |
| 2,618,259 | 11/1952 | Alexander . |
| 2,724,312 | 11/1955 | Gruetzner . |
| 2,781,042 | 2/1957 | Bartow . |
| 2,876,570 | 3/1959 | Swarbrick . |
| 2,889,744 | 6/1959 | Bonanno . |
| 2,917,854 | 12/1959 | Swarbrick . |
| 2,918,743 | 12/1959 | Swarbrick . |
| 2,930,286 | 3/1960 | Rabben . |
| 3,082,560 | 3/1963 | Elvestrom . |
| 3,143,642 | 8/1964 | Compare . |
| 3,151,520 | 10/1964 | Nadeau . |
| 3,158,479 | 11/1964 | Pluess . |
| 3,161,509 | 12/1964 | Howe et al. . |
| 3,178,993 | 4/1965 | Ferris et al. . |
| 3,226,867 | 1/1966 | Newton, Jr. . |
| 3,264,164 | 8/1966 | Jerothe et al. . |
| 3,312,006 | 4/1967 | Rowland . |
| 3,332,775 | 7/1967 | Mandler . |
| 3,357,772 | 12/1967 | Rowland . |
| 3,357,773 | 12/1967 | Rowland . |
| 3,370,371 | 2/1968 | Swarbrick . |
| 3,421,805 | 1/1969 | Rowland . |
| 3,467,741 | 9/1969 | Kesling . |
| 3,538,632 | 11/1970 | Anderson . |
| 3,586,592 | 6/1971 | Cahn . |
| 3,715,154 | 2/1973 | Bestenreiner . |
| 3,811,213 | 5/1974 | Eaves . |
| 3,937,565 | 2/1976 | Alasia . |
| 4,023,911 | 5/1977 | Julesz et al. . |
| 4,032,237 | 6/1977 | Julesz . |
| 4,080,634 | 3/1978 | Schreiber . |
| 4,101,210 | 7/1978 | Lo et al. . |
| 4,133,602 | 1/1979 | Ihms . |
| 4,135,502 | 1/1979 | Peck . |
| 4,158,481 | 6/1979 | Hoyer . |
| 4,541,007 | 9/1985 | Nagata . |
| 4,557,599 | 12/1985 | Zimring . |
| 4,625,290 | 11/1986 | White . |
| 4,694,407 | 9/1987 | Ogden . |
| 4,745,562 | 5/1988 | Prazdny . |
| 4,747,411 | 5/1988 | Ledley . |
| 4,829,365 | 5/1989 | Eichenlaub . |
| 4,839,824 | 6/1989 | Ando . |
| 4,878,735 | 11/1989 | Vilums . |
| 4,959,641 | 9/1990 | Bass et al. ............................. 345/139 |
| 4,961,153 | 10/1990 | Fredrickson et al. . |
| 4,987,487 | 1/1991 | Ichinose et al. . |
| 5,088,810 | 2/1992 | Galanter et al. . |
| 5,113,213 | 5/1992 | Sandor et al. . |
| 5,121,343 | 6/1992 | Faris . |
| 5,138,471 | 8/1992 | McGrew . |
| 5,146,415 | 9/1992 | Faris . |
| 5,165,013 | 11/1992 | Faris . |
| 5,206,671 | 4/1993 | Eydelman et al. . |
| 5,235,361 | 8/1993 | Super . |
| 5,264,964 | 11/1993 | Faris . |
| 5,371,627 | 12/1994 | Baccei et al. . |

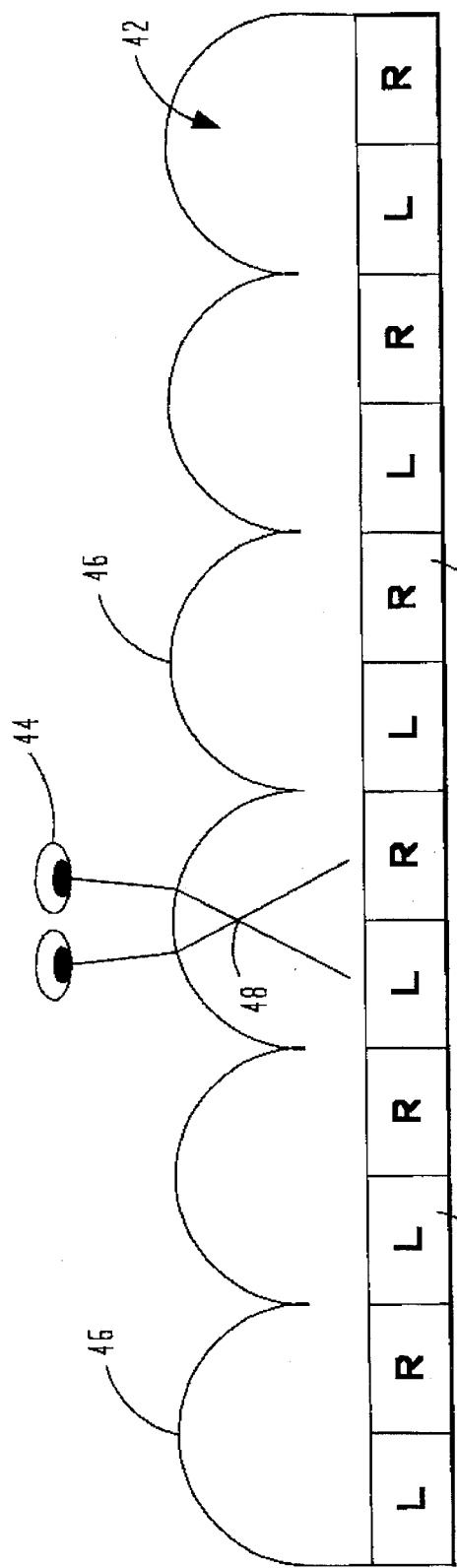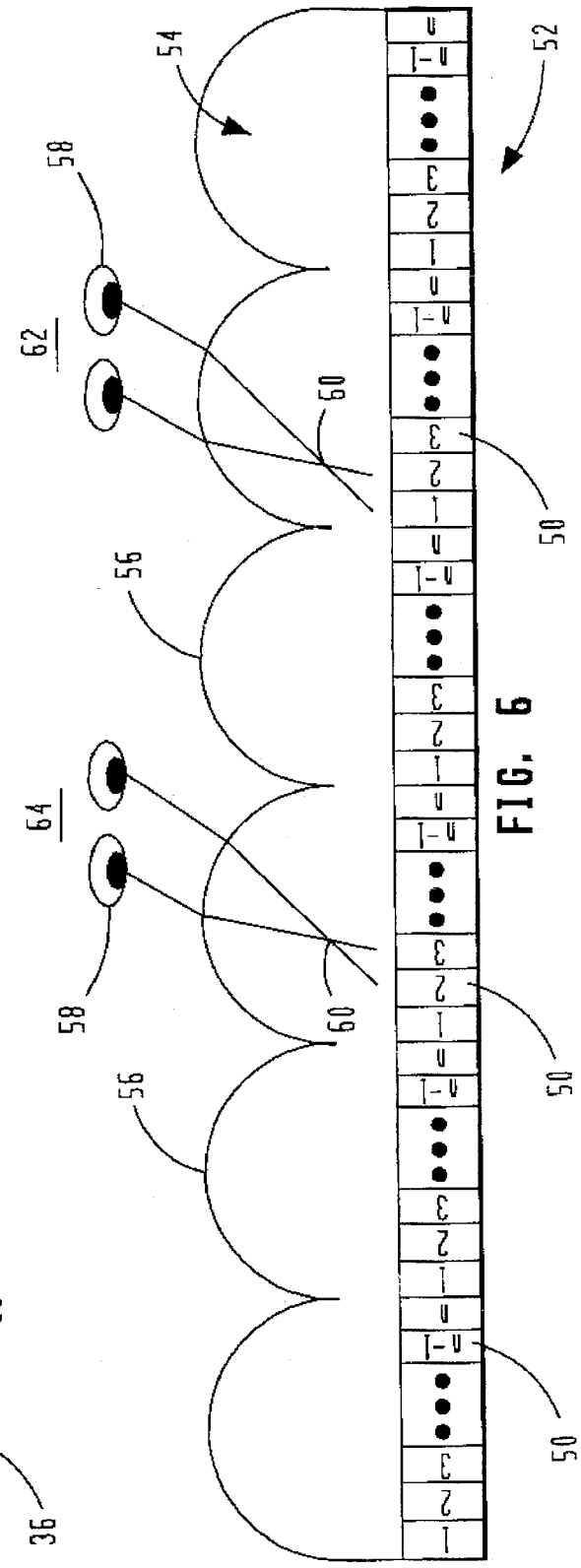

METHOD AND APPARATUS FOR AUTOSTEREOSCOPIC LENTICULAR DISPLAYS UTILIZING RANDOM DOT PATTERNS

TECHNICAL FIELD

The present invention relates to autostereoscopic displays, and more particularly, to an apparatus and method for combining lenticular display techniques with dual image random dot patterns.

BACKGROUND OF THE INVENTION

Stereo pair displays are stereoscopic displays containing separate left eye and right eye images. These images are viewed by various techniques allowing each eye to separately perceive its associated image and thus, allow a viewer to perceive a single three dimensional image. One common technique for viewing stereo pair displays involves the use of left and right eye filters, such as red-blue filters or polarized filters. Stereo pairs may also be placed side by side and viewed without the aid of a viewing device by free viewing. Free viewing involves crossing ones vision or extending ones focal point beyond the page containing the stereo pair images such that each image of the stereo pair appears to overlap and create a single stereoscopic image.

One type of stereo pair image display includes random dot stereograms consisting of a pair of apparently random patterns of dots (pixels) that when viewed stereoscopically, produce a three dimensional image. In a random dot stereo pair, each image frame is devoid of monocular cues. This means that each image frame, by itself, is meaningless and retains no information specific to the stereoscopic image. Parallax differences are achieved between the right eye and left eye image frames by making slight horizontal shifts to the pixels comprising the random patterns. The left eye and right eye image patterns are identical, except for these pixel shifts. When free viewing or viewing using some type of stereoscopic filter or device, the pixel shifts between the images are taken as depth cues by the brain and causes the perception of depth by a viewer.

The inherent limitation of all stereo pair displays, including dual image random dot stereograms, is the failure of the displays to be autostereoscopic. Autostereoscopic displays are displays in which apparent depth can be perceived without the use of a viewing device. Viewing of stereo pair displays require viewing devices or requires complicated and often eye tiring free viewing of the images. Thus, an autostereoscopic display presents a simpler means for viewing stereoscopic images.

A lenticular screen display is one type of autostereoscopic display comprised of a flat rear surface containing a photographed or lithographically printed image composed of a number of interlaced source frames. A lenticular material consisting of a series of cylindrical lenses allows light to enter and be focused upon the flat rear surface. In a lenticular screen display, source frames generally contain images from progressive prospectives of an object or objects in the display. The source frames are interlaced into very fine alternating vertical strips and then compressed horizontally so that the resulting image is the width of a single one of the source frames.

A lenticular material is then placed over the resulting image. As the viewer perceives the display through the lenticular material, the left eye sees one group of strips corresponding to a first source frame through the lenses of the lenticular material, while the right eye sees a second group of strips corresponding to a second source frame through the lenses of the lenticular material. Depending on the viewing angle, the lenses focus the viewers left and right eyes on the interlaced strips of any two adjacent or closely related groups of source frames forming a stereo pair. As the viewer changes viewing angles, such as by walking in one direction across the front of the display, the stereo pair of source frames that the viewer sees through the lenticular material changes. In theory, a infinite number of frames can be interlaced with this process with each frame differing from its neighbors by minute changes in perspective. In practice, normally ten or more interlaced frames are used.

Lenticular autostereoscopic displays also achieve an animation sequence of images if a high number of interlaced source frames are used. However, the ability to show animation within normal lenticular displays requires an exceptionally high number of source frames to be used since each pair of frames must contain an image that has not moved to such a degree that stereoscopic perception of the image is unable to be achieved. Thus, lenticular autostereoscopic animation is limited in that the displacement of objects between any two adjacent or closely related frames must be sufficiently small or negligible, so as not to interfere with the stereoscopic viewing of the adjacent source frames.

Thus, autostereoscopic displays not containing the limitations of presently existing lenticular screen displays or stereo pair images is desired.

SUMMARY OF THE INVENTION

The present invention overcomes the foregoing and other problems with a method and apparatus for a lenticular autostereoscopic display using random dot image patterns. The present invention comprises a display having a first layer containing a composite image frame. The composite image frame is produced by first generating a number of random dot image frames. Each image frame is a member of an image frame pair that when viewed stereoscopically produces a stereoscopic image. The plurality of random dot image frames are each subdivided into a number of vertical strips. These strips are then alternately interlaced to form the composite image frame. These interlaced random dot image frames are then compressed to create a composite image frame of a size substantially equal to the size of the original random dot image frames. A lenticular material is prepared according to parameters defining the size and spacing of the plurality of interlaced vertical strips of the composite image frame. This lenticular material is attached to the surface of the composite image frame, and a viewer autostereoscopically perceives the images formed by the image pairs created by adjacent or closely related groups of vertical strips of random dot image frames merely by viewing the image frames through the lenticular material.

BRIEF DESCRIPTION OF THE DRAWINGS

For a more complete understanding of the present invention and the advantages thereof, reference is now made to the following Detailed Description taken in conjunction with the accompanying Drawings in which:

FIG. 5 is an illustration of the lenticular autostereoscopic display of the present invention using a pair of interlaced random dot image frames; and FIG. 6 is an illustration of a lenticular autostereoscopic display of the present invention using a plurality of interlaced random dot image frames.

DETAILED DESCRIPTION

Figure 1A:
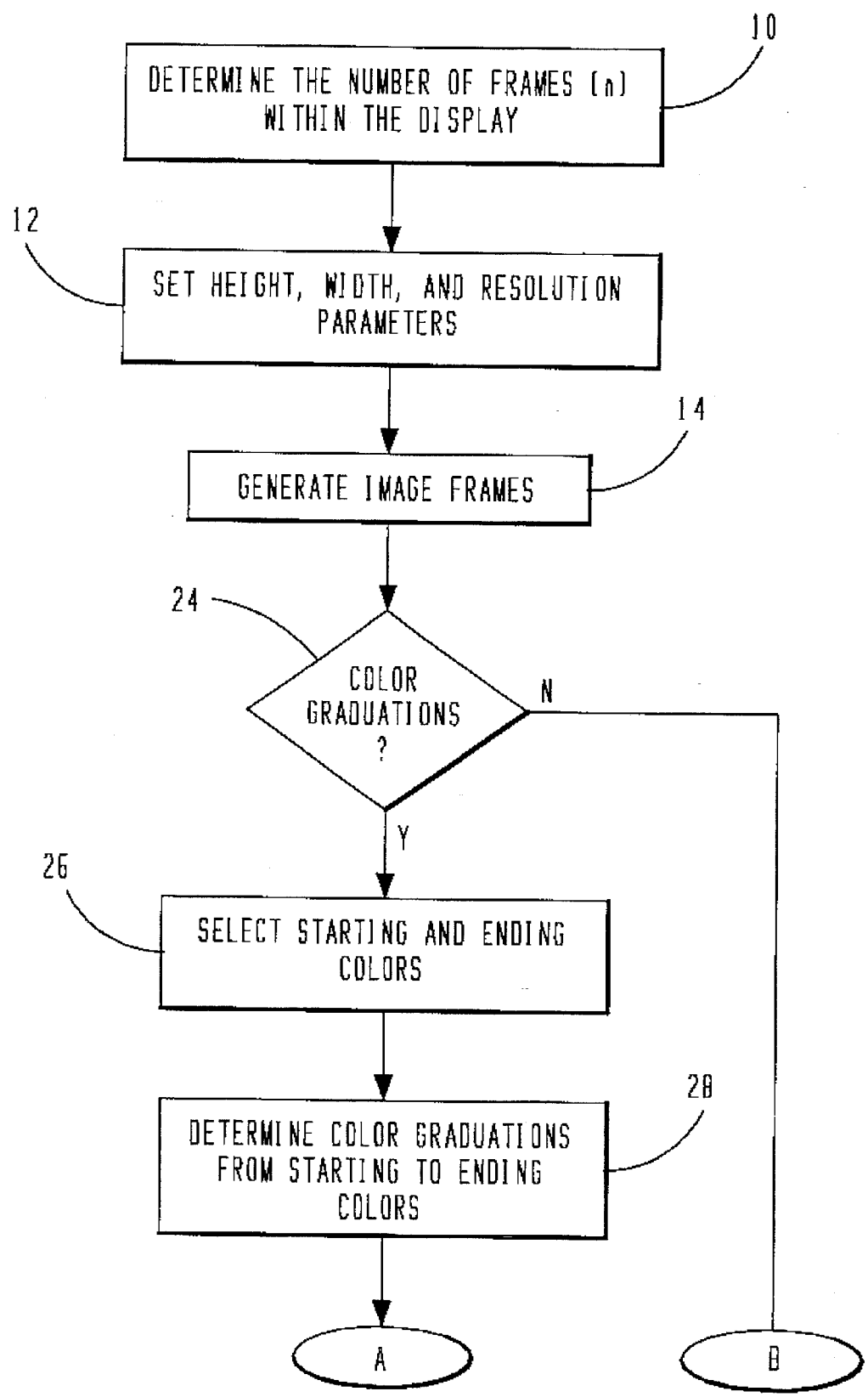
FIGS. 1a and 1b are a flow diagram illustrating the method for generating a lenticular autostereoscopic display using random dot patterns.
Figure 1B:
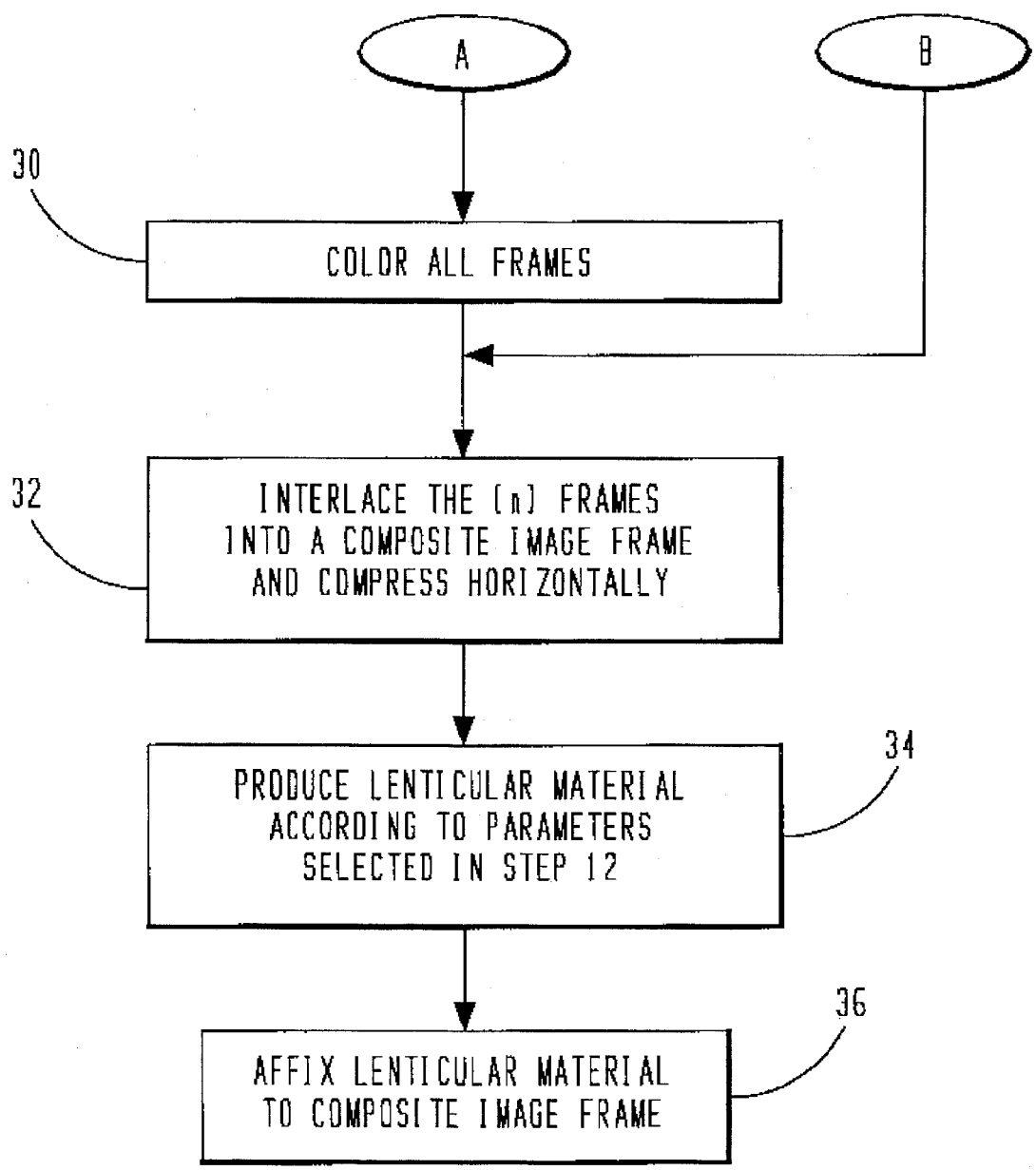

Referring now to the Drawings, and more particularly to FIG. 1, wherein there is illustrated a method for producing the lenticular autostereoscopic displays using random dot patterns of the present invention. It is to be understood that while the following description refers to the use of random dot stereo pairs, the use of any type of random pattern stereo pair will function as well in the present invention. Initially, the number of random dot image frames comprising the display is selected at step 10. The number of image frames selected will be one more than the number of stereoscopic images produced by the image frames. Thus, where only a single stereoscopic image is desired only two image frames are required. The relationship between the number of image frames required and the number of stereoscopic images produced by the image frames is such that for each (n) image frames there are created (n-1) stereoscopic images.

At step 12, the various defining parameters for the lenticular autostereoscopic display are selected. These parameters include the height of each image frame to be generated, the width of each image frame to be generated, the number and width of vertical strips within a composite image frame, and the resolution of the composite image frame to be generated. It is to be understood that these examples of defining parameters are not exclusive and that various other parameters may be included to achieve a desired result. Using the parameters defined in step 12, the selected number of image frames are generated at step 14 to create the (n-1) stereoscopic images.

Figure 2:
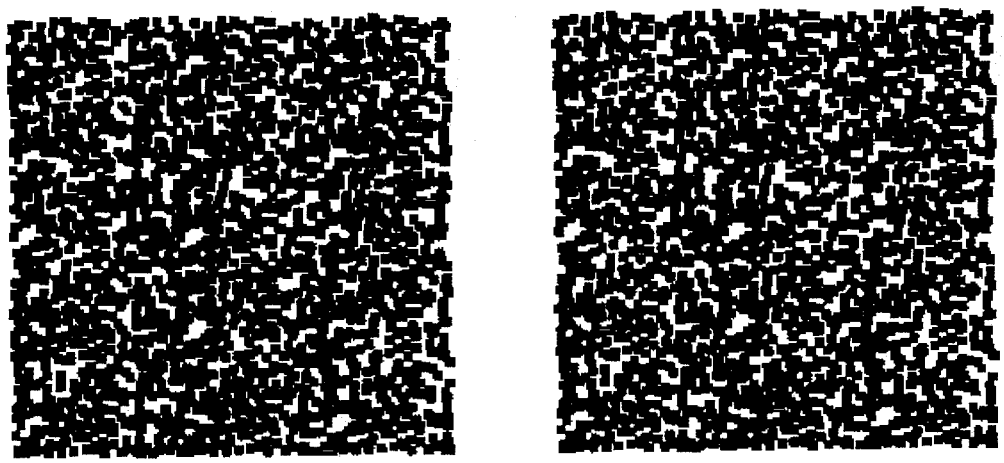
FIG. 2 is an illustration of a random dot stereo pair.
Figure 3:
FIG. 3 is an illustration of a random dot stereo pair independent sequence.

FIG. 2 illustrates a single random dot image pair, wherein only two image frames are generated to produce a single stereographic image. FIG. 3 illustrates an independent stereo sequence of random dot image stereo pairs, wherein image frame 16 forms a stereoscopic image pair with image frame 18, image frame 18 forms a stereoscopic image pair with image frame 20, and image frame 20 forms a stereoscopic image pair with image frame 22. A feature of the present lenticular display application not found in known lenticular display applications is that the random patterns of the image frames of the present invention are singly devoid of monocular cues.

Known composite image frames are comprised of a series of image frames having a differing perspective upon a common object or objects (a stereo sequence of image frames). Any given stereo pair of image frames is inherently linked to and dependent upon the images in all other frames. For example if a first frame is an image of a dog, a second frame must be a slightly different perspective of that same dog in order to create a stereoscopic image of the dog in conjunction with the first frame. A third frame must be still a slightly different perspective of the dog in the second frame in order to create a stereoscopic image with the second frame and so forth. This phenomena is termed a dependent stereo sequence.

Dependent stereo sequences require that all image frames in a closely associated area contain stereoscopic images of basically the same base image, and thus, limits the number of images presentable over a small viewing area such as a composite image frame. In an independent stereo sequence two random dot frames work together to form a stereoscopic image, but each frame by itself does not contain any information relating to the stereoscopic image. Additional advantages provided by the independent stereo sequence image frames will be more fully discussed in a moment.

Unlike the dependent stereo sequence image pairs of previous lenticular displays, a series of random dot stereo image pairs provide an independent stereo sequence. The random patterns of the random dot stereo pairs are devoid of monocular cues. Each image frame, by itself, contains no meaningful information related to the stereoscopic image provided by an image frame pair. Therefore, any stereoscopic image formed by any two adjacent or closely related image frames is not linked to or dependent on any other stereoscopic image in the sequence. This feature allows an independent stereo sequence to be created in which the random pattern of frame 16 combines with the random pattern of frame 18 to create a first stereoscopic image, and the random pattern of frame 18 combines with the random pattern of frame 20 to create a second independent stereoscopic image, and so forth.

Referring again to FIG. 1, once the image frames are generated at step 14, the user may choose at step 24 to color the image frames according to a selected color gradation scheme. If color gradations are desired for a sequence or pair of image frames, a starting and ending color are selected at step 26 for a corresponding starting and ending image frames within a sequence of image frames. Next, the color for the remaining (n-2) image frames are selected at step 28 such that the colors between adjacent or closely related image frames vary slightly from the starting image frame color to the ending image frame color. The colors gradually change between adjacent image frames to minimize adverse effects upon the viewing of stereoscopic images. When drastically different colors are utilized in adjacent image frames, the contrasting colors compete with each other during stereoscopic viewing and make the viewing more difficult. However, if there is a gradual change from one color to another, and the discrepancy between colors of any two adjacent image frames is sufficiently small, the colors between adjacent frames work together harmoniously. All frames are colored at step 30 according to the colors selected at steps 26 and 28.

After the frames have been colored at step 30, or if a determination is made at step 24 that no color gradations are desired, the image frames are interlaced into a composite image frame and compressed horizontally using computer or photographic means at step 32. This step will be more fully discussed in a moment. After the composite image frames have been created, a lenticular material is produced at step 34 in accordance with the parameters selected at step 12. The lenticular material is affixed at step 32 to the composite image frame to complete the lenticular autostereoscopic display.

Figure 4A:
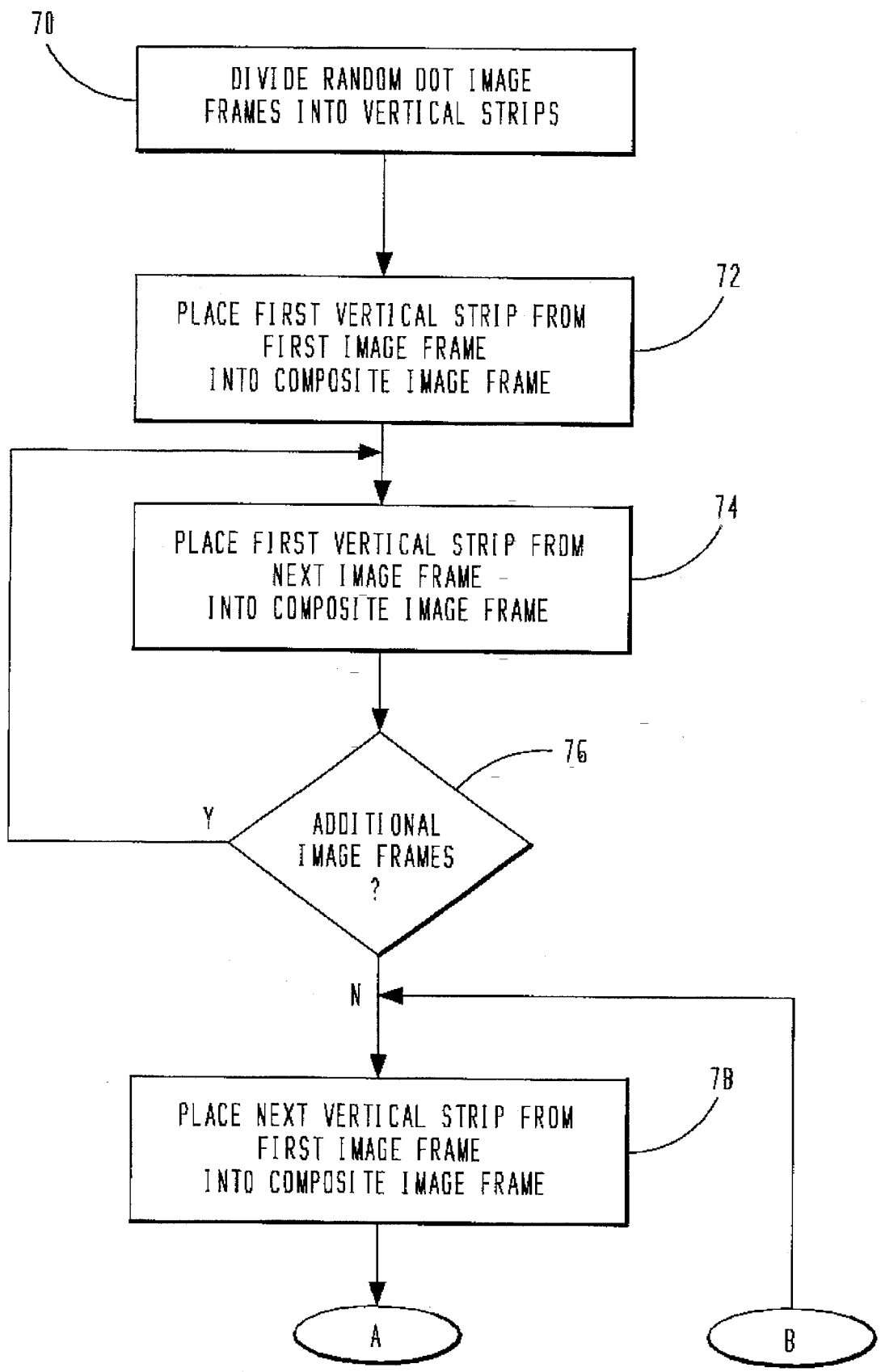
FIGS. 4a and 4b are flow diagrams more fully illustrating the procedure for interlacing a plurality of image frames.
Figure 4B:
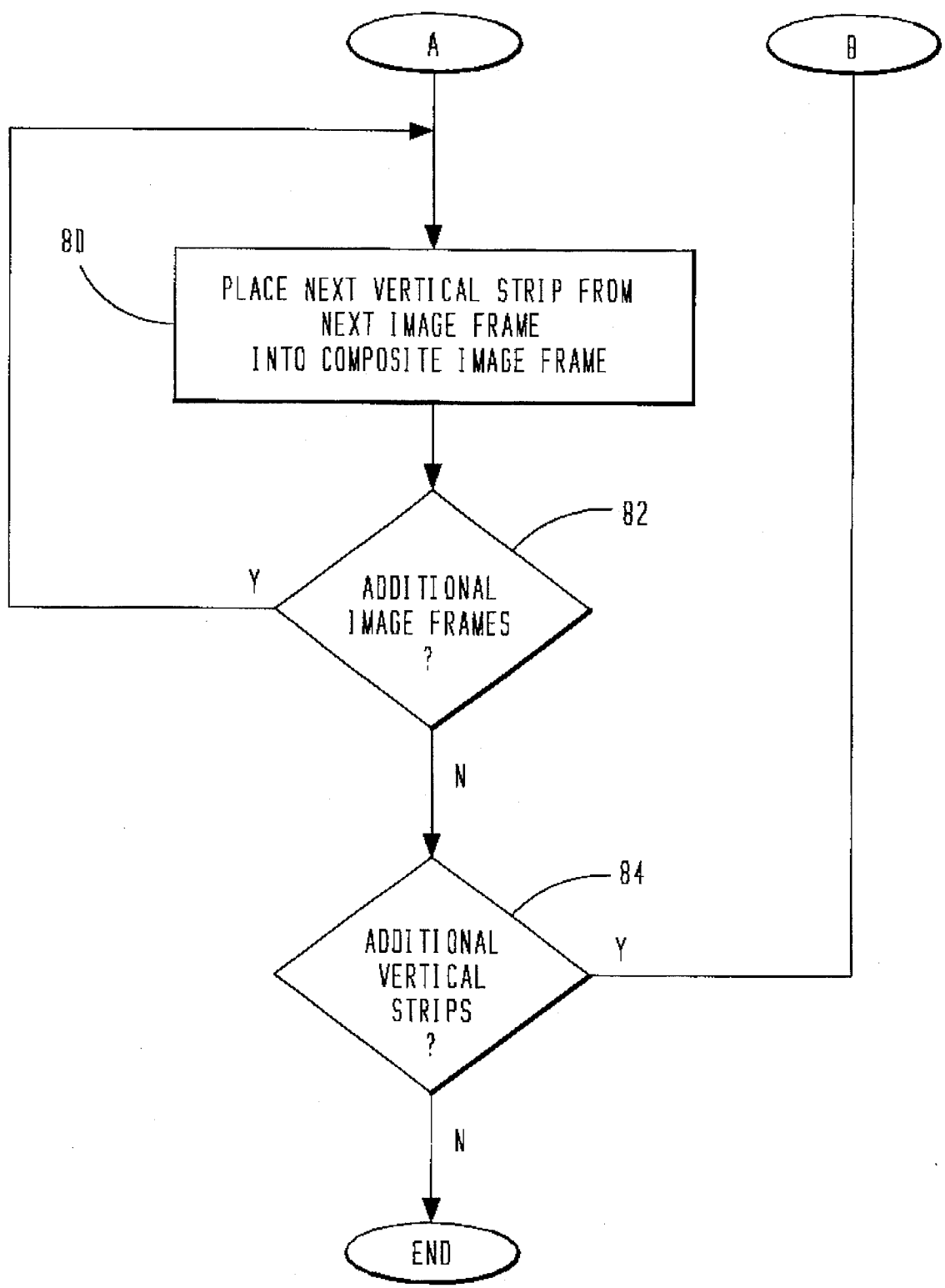
Figure 2:
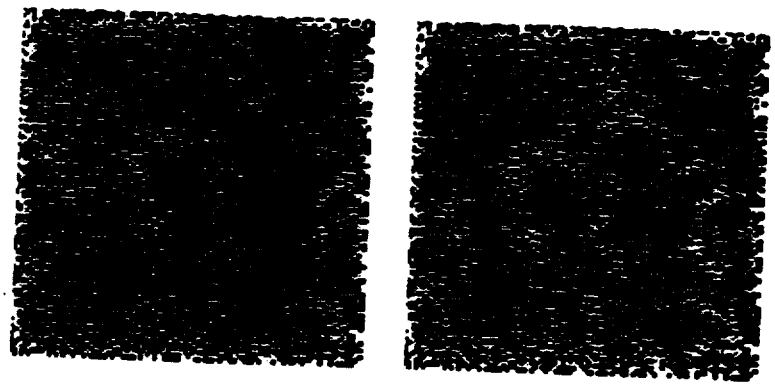
Figure 3:
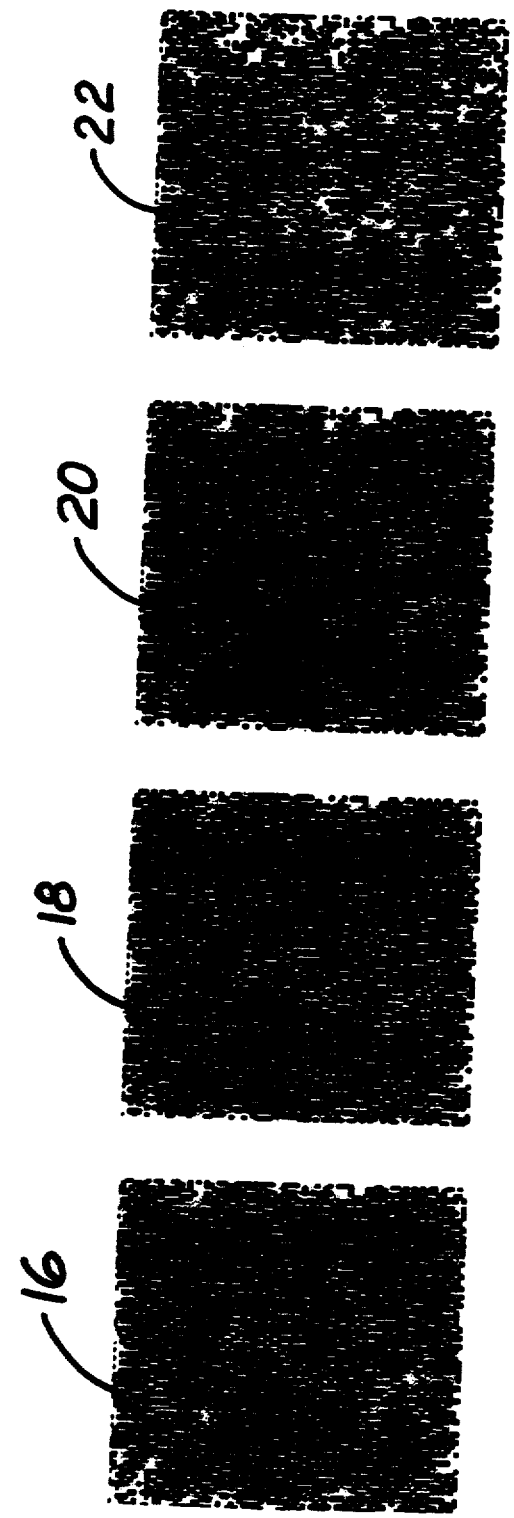

Referring now to FIGS. 4a and 4b, there is a flow diagram more fully illustrating one method for interlacing image frames into a composite image as discussed at step 32. It is to be understood a variety of methods exist by which a plurality of image frames may be interleaved into a composite image frame. Each of the random dot image frames are first divided at step 70 into a plurality of vertical strips. The width and number of the strips are determined by the parameters set at step 12. The first vertical strip from a first image frame is placed at step 72 into a composite image frame. The first vertical strip from the next image frame is placed at step 74 into the composite image frame. Inquiry step 76 determines if any additional image frames exist. If there are additional image frames, control returns to step 74 until each image frame has placed a vertical strip into the composite image frame.

Once each image frame has placed a vertical strip into the composite image frame, control passes to step 78 wherein the next vertical strip of the first image frame is placed into the composite image frame. The next vertical strip of the next image frame is placed into the composite frame image at step 80. Inquiry step 82 determines if all of the image frames have again placed a vertical strip into the composite frame image and returns control to step 80 until all image frames have added another vertical strip. Inquiry step 84 determines if all vertical strips have been added to the composite image frame and if not, returns control to step 78. Once all vertical strips have been added to the composite image frame the process ends.

Referring now to FIG. 5, there is illustrated a side view of a lenticular autostereoscopic display using random dot patterns of the present invention. FIG. 5 illustrates an embodiment of the invention in which only two image frames are utilized in creating the display. The composite image frame 36 comprises an interlaced left image frame 38 and right image frame 40. The left image frame 38 and right image frame 40 comprise a stereo pair which when viewed stereoscopically allow a viewer to see the encoded stereoscopic image. By interlacing the left and right images (38 and 40) into alternating, adjacent vertical strips and placing a lenticular material 42 over the surface of the composite image frame 36, a viewer 44 is able to automatically perceive the stereoscopic image created by the left and right image frames. This is achieved by the lenses 46 of the lenticular material 42.

Normally, when the composite image frame 36 is viewed by the viewer 44 through the lenses 46 of the lenticular display 42, the right eye of the viewer 44 focuses only upon the group of interlaced strips of the right image frame 40 and the left eye of the viewer 44 focuses only upon the group of interlaced strips of the left image frame 38. This causes the viewer 44 to perceive a stereoscopic or three dimensional image. As the viewer 44 proceeds to other positions, the lenses 46 of the lenticular material 42 will normally cause the left and right eyes of the viewer 44 to focus on the corresponding group of strips (38 and 40) of the composite image frame. However, at some positions the group of vertical strips perceived by the left and right eyes of the viewer 44 will reverse and cause the viewer to perceive an inverted view of the stereoscopic image. This problem is overcome by increasing the number of image frames 50 within the composite image frame 52 as shown in FIG. 6.

Referring now to FIG. 6 there is illustrated an embodiment of the present invention, wherein a greater number of image frames 50 are incorporated into a composite image frame 52. The composite image frame 52 is composed of any number of separate image frames 50 from (1) to (n). Each adjacent or closely related pair group of image frames 50 combine to generate a separate stereoscopic image. Thus, for example, the image frames 50 of group one (1) and group two (2) combine to create the image of a dog, while image frames two (2) and three (3) may combine to create the image of a boat. The composite image frame 52 is overlain by a lenticular material 54 containing a number of lenses 56.

As before, the lenses 56 of the lenticular material 54 cause a viewer 58 to view adjacent or closely related groups of frame strips 50 of the composite image frame 52 and perceive a stereoscopic image. Unlike the previous example, the viewing of the composite image frame 52 through the lenticular material 54 allows a viewer 58 to perceive a variety of images depending upon the viewing angle. Thus, if a viewer 58 perceives the composite image frame 52 from a position 62, the viewer may focus upon composite image frame strips groups one (1) and two (2) throughout the composite display and view a first image. Upon changing to a second viewing position 64, the lenticular material 54 causes the viewer 58 to focus upon image frame strips groups two (2) and three (3) and see a second image.

In this manner by altering the viewing angle or position of the viewer 58 with respect to the composite image frame 52, the viewer is able to perceive a sequence of images as his eyes travel from left to right across the face of the lenticular material 54. The images for various pairs of image frames may be different for each pair. For example, frame one (1) and frame two (2) would form an image of a dog, frame two (2) and frame three (3) would form an image of a boat, and frame (n-1) and frame (n) would form an image of a cat. The images for various pairs of image frames also may create an animation sequence. For example, frame one (1) and frame two (2) would form an image of a ball, frame two (2) and frame three (3) would form an image of a ball at a lower position and frame (n-1) and frame (n) would form an image of the ball impacting the ground. In this manner, the viewer 58 may perceive a sequence of differing images as the material passes across his eyes, or an animated sequence of images giving the impression of movement of a character or object.

Although preferred embodiments of the present invention have been illustrated in the accompanying Drawings and described in the foregoing Detailed Description, it will be understood that the invention is not limited to the embodiments disclosed, but is capable of numerous rearrangement, modifications, and substitutions of parts and elements without departing from the spirit of the invention.

We claim:

1. An autostereoscopic display, comprising:
   a first layer containing a composite image frame of a plurality of colored random pattern image frames having color gradations between closely related frames and interlaced into a plurality of alternating vertical strips, wherein closely related pairs of the vertical strips form image pairs for generating a stereoscopic image; and
   a second layer covering the first layer for focusing vision of a viewer on the closely related pairs of interlaced vertical strips such that the viewer perceives the stereoscopic image.

2. The autostereoscopic display of claim 1, wherein the stereoscopic images generated by the image pairs comprise a plurality of unique and different stereoscopic images.

3. The autostereoscopic display of claim 1, wherein the stereoscopic images generated by the image pairs comprise an animation sequence of stereoscopic images.

4. The autostereoscopic display of claim 1, wherein the second layer further comprises a lenticular material.

5. The autostereoscopic display of claim 4, wherein the lenticular material further comprises a plurality of cylindrical lenses.

6. An autostereoscopic display, comprising:
   a first layer containing a composite image frame including a plurality of colored random pattern image frames having color gradations between closely related frames and interlaced into a plurality of alternating vertical strips, wherein closely related pairs of the vertical strips form image pairs for generating a stereoscopic image; and a lenticular lens layer covering the first layer, the lenticular lens layer including a plurality of cylindrical lenses for focusing vision of a viewer on the closely related pairs of interlaced vertical strips such that the viewer perceives the stereoscopic image.

7. The autostereoscopic display of claim 6, wherein the stereoscopic image generated by the image pairs comprises a plurality of unique and different stereoscopic images.

8. The autostereoscopic display of claim 6, wherein the stereoscopic image generated by the image pairs comprises an animation sequence of stereoscopic images.

9. A method for producing an autostereoscopic display, comprising the steps of:

generating a plurality of random pattern image frames, each of the image frames a member of a frame pair forming a stereoscopic image;

coloring the generated plurality of random pattern image frames according to a selected color gradation scheme;

combining the plurality of random pattern image frames into a composite image frame as a number of alternating vertical strips;

covering the composite image frame with a lenticular material to provide an autostereoscopic viewing.

10. The method of claim 9, further including the step of compressing the combined plurality of random pattern image frames to a selected size.

11. The method of claim 9, wherein the step of coloring further includes the steps of:

selecting a starting color for a first random pattern image frame;

selecting an ending color for a last random pattern image frame; and determining required color gradations between the starting color and the ending color for each random pattern image frame between the first image frame and the last image frame.

12. The method of claim 9, wherein the step of generating further includes the step of selecting a total number of the random pattern image frames to be generated.

13. The method of claim 9, wherein the step of generating further includes the step of selecting parameters controlling the generation of the composite image frame and the random pattern image frames.

14. The method of claim 9 further including the step of manufacturing a lenticular material according to selected parameters controlling the generation of the composite image frame.

15. A method for producing an autostereoscopic display, comprising the steps of:

generating a plurality of random pattern image frames, each of the image frames a member of a frame pair forming a stereoscopic image;

coloring the generated plurality of random pattern image frames according to a selected color gradation scheme;

dividing the random pattern image frames into a plurality of vertical strips;

alternately combining the plurality of vertical strips from each of the plurality of random pattern image frames to generate a composite image frame;

compressing the composite image to a selected size; and covering the composite image frame with a lenticular material to provide autostereoscopic viewing.

16. The method of claim 15, wherein the step of coloring further includes the steps of:

selecting a starting color for a first random pattern image frame;

selecting an ending color for a last random pattern image frame; and determining required color gradations between the starting color and the ending color for each random pattern image frame between the first image frame and the last image frame.

17. The method of claim 15, wherein the step of generating further includes the step of selecting a total number of the random pattern image frames to be generated.

18. The method of claim 15, wherein the step of generating further includes the step of selecting parameters controlling the generation of the composite image and the plurality of random pattern image frames.

19. The method of claim 15 further including the step of manufacturing lenticular material occurring to selected parameters controlling the generation of the composite image frame.

\* \* \* \* \*

UNITED STATES PATENT AND TRADEMARK OFFICE
CERTIFICATE OF CORRECTION

PATENT NO. : 5,543,965
DATED : August 6, 1996
INVENTOR(S) : Michael S. Bielinski, et al.

It is certified that error appears in the above-identified patent and that said Letters Patent is hereby corrected as shown below:

The sheets of Drawings, consisting of figures 2 and 3 should be deleted to appear as per attached figures 2 and 3.

Signed and Sealed this

Eighteenth Day of February, 1997

Attest:

BRUCE LEHMAN

*Attesting Officer*      *Commissioner of Patents and Trademarks*